（12） United States Patent
Ushio et al.

(10) Patent No.: US 11,237,457 B2
(45) Date of Patent: Feb. 1, 2022

(54) BLADE OPEN-CLOSE DEVICE

(71) Applicant: NIDEC COPAL CORPORATION, Tokyo (JP)

(72) Inventors: Ryosuke Ushio, Tokyo (JP); Kenzo Imai, Tokyo (JP); Nobuaki Watanabe, Tokyo (JP)

(73) Assignee: NIDEC COPAL CORPORATION, Tokyo (JP)

( * ) Notice: Subject to any disclaimer, the term of this patent is extended or adjusted under 35 U.S.C. 154(b) by 0 days.

(21) Appl. No.: 16/941,539

(22) Filed: Jul. 29, 2020

(65) Prior Publication Data

US 2021/0033948 A1 Feb. 4, 2021

(30) Foreign Application Priority Data

Jul. 30, 2019 (JP) .............................. JP2019-140042

(51) Int. Cl.
*G03B 11/04* (2021.01)
*H02K 41/035* (2006.01)

(52) U.S. Cl.
CPC ........ *G03B 11/043* (2013.01); *H02K 41/0354* (2013.01)

(58) Field of Classification Search
CPC ................................................... G03B 11/043
See application file for complete search history.

(56) References Cited

U.S. PATENT DOCUMENTS

| | | | | |
|---|---|---|---|---|
| 5,949,474 A * | 9/1999 | Gerszberg | ............... | H04N 7/142 348/14.01 |
| 6,589,018 B2 * | 7/2003 | Chen | ..................... | F04D 29/263 310/71 |
| 7,525,792 B2 * | 4/2009 | Yokote | .................. | G06F 1/1616 200/302.1 |
| 7,548,255 B2 * | 6/2009 | Bear | .................. | H04N 5/23203 348/14.01 |
| 8,988,532 B2 * | 3/2015 | Soffer | .................... | G03B 17/18 348/207.1 |
| 9,307,129 B2 * | 4/2016 | Oh | .......................... | H04M 1/67 |
| 10,133,152 B2 * | 11/2018 | Kang | ..................... | G03B 13/36 |
| 10,887,763 B2 * | 1/2021 | Yang | ....................... | G06F 21/83 |

(Continued)

FOREIGN PATENT DOCUMENTS

| | | |
|---|---|---|
| JP | H6123914 A | 5/1994 |
| JP | 2004173100 A | 6/2004 |

(Continued)

*Primary Examiner* — Clayton E. LaBalle
*Assistant Examiner* — Leon W Rhodes, Jr.
(74) *Attorney, Agent, or Firm* — Hauptman Ham, LLP (57) ABSTRACT

A technique reduces images unintended by the user captured with an electronic device having a camera function by unauthorized access or an accidental operation performed by the user. A blade open-close device includes a blade that opens or closes a lens aperture in a camera module, an actuator that opens or closes the blade, a drive that drives the actuator, and a switch that inputs an opening signal and a closing signal into the drive. The switch includes a mechanical switch operation member that generates the opening signal and the closing signal in response to a manual operation performed by a user. The drive is independent of a drive output from the camera module.

19 Claims, 9 Drawing Sheets

(56) References Cited

U.S. PATENT DOCUMENTS

| | | | |
|---|---|---|---|
| 2012/0148227 A1* | 6/2012 | Schmit | G03B 11/043 396/448 |
| 2015/0156898 A1* | 6/2015 | Shin | H04M 1/0256 361/679.02 |
| 2015/0163385 A1* | 6/2015 | Haddad | G03B 9/08 348/374 |

FOREIGN PATENT DOCUMENTS

| | | | |
|---|---|---|---|
| JP | 2009145471 A | 7/2009 | |
| JP | 3170619 U | 9/2011 | |

* cited by examiner

BLADE OPEN-CLOSE DEVICE

RELATED APPLICATIONS

The present application claims priority to Japanese Application Number 2019-140042, filed Jul. 30, 2019, the disclosure of which is hereby incorporated by reference herein in its entirety.

BACKGROUND

Technical Field

The present invention relates to a blade open-close device for opening and closing a blade.

Description of the Background

Many recent electronic devices are capable of processing, storing, and transmitting obtained images, and commonly have a camera function (camera module) for capturing images. Many recent electronic devices are also used while connected to a network, as expressed in the Internet of Things (IoT). Such electronic devices have measures against unauthorized external access through the network.

An electronic device with a camera function typically has a lens aperture in a camera module constantly uncovered. In the IoT, the camera function may be activated by a malicious remote operation, possibly capturing images unintended by the user. This can cause leakage of private images or degraded security due to unauthorized image capturing.

Also, the user using a mobile information terminal, such as a personal computer (PC) or a smartphone, may accidentally activate the camera function by an unintended operation. In such a case, images unintended by the user may be captured and stored in the electronic device, possibly causing external leakage of the stored images or the user being suspected of secretly taking pictures.

In response to the issue, the lens aperture may be covered with a shield when the camera function is unused and may be uncovered simply when the camera function is used. For example, a slidable shield in a housing of an electronic device may be manually slid to uncover the lens aperture when the camera function is used and may be manually slid to cover the lens aperture when the camera function is unused (refer to Patent Literature 1 below).

CITATION LIST

Patent Literature

Patent Literature 1: Japanese Registered Utility Model No. 3170619

BRIEF SUMMARY

The known technique described above uses a shield covering the lens aperture when the camera function is unused to reduce images unintended by the user captured with the electronic device. However, the manually operated shield may be open or closed incompletely. When the user intends to cover the lens aperture by sliding the shield, the shield may stop before completely covering the lens aperture without being noticed by the user. When the user intends to uncover the lens aperture by sliding the shield, the shield may stop before completely uncovering the lens aperture without being noticed by the user.

The partially uncovered lens aperture may capture images unintended by the user with the electronic device when the camera function is unused. The partially covered lens aperture may cause failures to capture intended images when the camera function is used. An electrically operable shield to avoid such situations may be operated remotely by unauthorized access, and thus cannot be effective against unauthorized access.

In response to the above issue, one or more aspects of the present invention are directed to techniques for reducing images unintended by the user captured with an electronic device having a camera function by, for example, unauthorized access or an accidental operation performed by the user, and reliably uncovering the lens aperture when the camera function is used and reliably covering the lens aperture when the camera function is unused.

The device according to one or more aspects of the present invention has the structure described below.

A blade open-close device includes a blade that opens or closes a lens aperture in a camera module, an actuator that opens or closes the blade, a drive that drives the actuator, and a switch that inputs an opening signal and a closing signal into the drive. The switch includes a mechanical switch operation member that generates the opening signal and the closing signal in response to a manual operation performed by a user. The drive is independent of a drive output from the camera module.

DETAILED DESCRIPTION

Embodiments of the present invention will now be described with reference to the drawings. Hereafter, the components with similar functions in different figures are indicated by like reference numerals, and will not be described repeatedly.

Figure 1A:
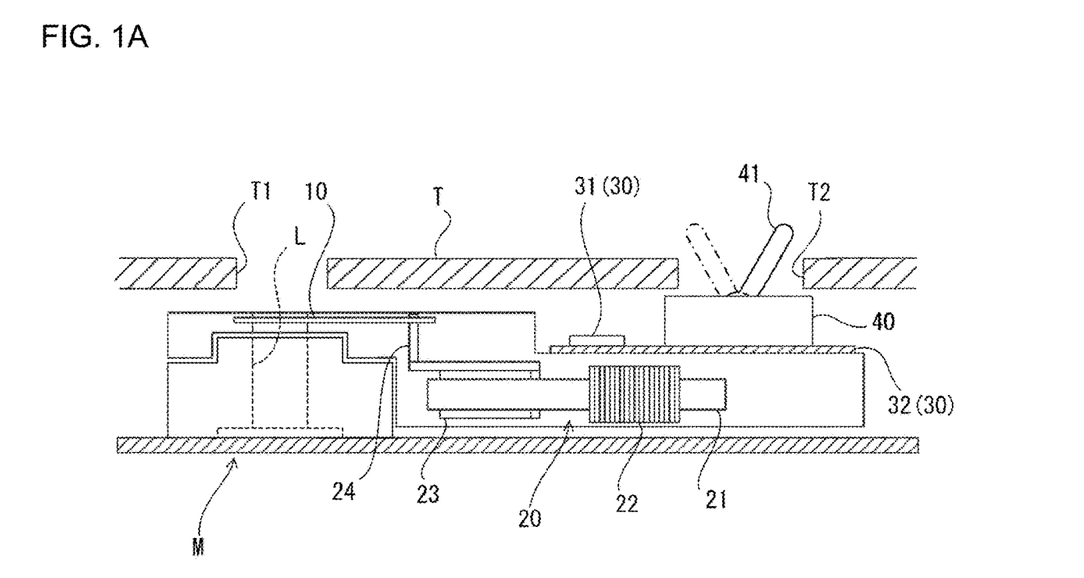
FIG. 1A is a schematic diagram of a blade open-close device according to an embodiment of the present invention in a closed state.
Figure 1B:
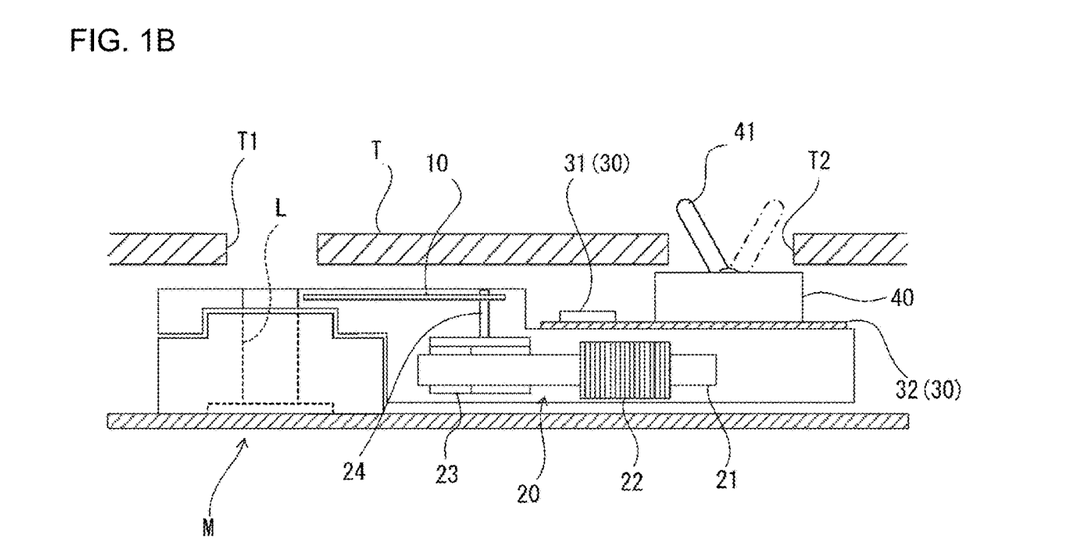
FIG. 1B is a schematic diagram of the blade open-close device in an open state.

As shown in FIGS. 1A and 1B, a blade open-close device 1 includes a blade 10 for opening or closing a lens aperture L in a camera module M having a camera function in an electronic device, an actuator 20 for opening or closing the blade 10, a drive 30 for driving the actuator 20, and a switch 40 for inputting an opening signal or a closing signal into the drive 30.

In the illustrated example, the blade open-close device 1 is accommodated in a housing T of an electronic device. The blade open-close device 1 is located to allow the blade 10 to open or close the lens aperture L, which is coaxial with an opening T1 in the housing T, in the camera module M. The blade 10 is a thin plate having a thickness along the center axis of the lens aperture L. The blade 10 is slidable in a direction crossing the center axis of the lens aperture L and is movable between a position to cover the lens aperture L (closed state) and a position to uncover the lens aperture L (open state).

The actuator 20 moves the blade 10 to either of the two positions at which the blade 10 is open and closed. In the illustrated example, the actuator 20 includes a yoke 21, a coil 22 wound around the yoke 21, a rotor magnet 23 rotatable by magnetic polarities alternating at the ends of the yoke 21 as the coil 22 is energized, and a lever 24 connecting the rotor magnet 23 to the blade 10. The actuator 20 may have another specific structure.

The drive 30 drives the actuator 20. In the illustrated example, the drive 30 includes a driver 31 that controls energization of the coil 22 and a circuit board 32 on which the driver 31 is mounted.

The drive 30 has the circuit configuration independent of a drive output from the camera module M. Unlike the aperture or the shutter driven to control an amount of light exposure in accordance with a drive output, such as an amount of light received by the camera, the drive 30 can activate or deactivate the actuator 20 independently of the driving state of the camera module M.

The switch 40 selectively inputs either an opening signal or a closing signal into the drive 30. The switch 40 includes a mechanical switch operation member 41 that generates an opening signal and a closing signal in response to the user's manual operation alone. In the illustrated example, the mechanical switch operation member 41 protrudes outside through an opening T2 in the housing T. The switch operation member 41 is switched to generate either an opening signal or a closing signal, which is then input into the drive 30.

In the illustrated example, the switch 40 is mounted on the circuit board 32 in the drive 30 near the camera module M. The drive 30 and the switch 40 are supported integrally with the actuator 20, forming the blade open-close device 1 into a unit. The switch 40 may be away from the camera module M. In this case, the switch 40 is connected to the drive 30 with predetermined wiring.

Figure 2:
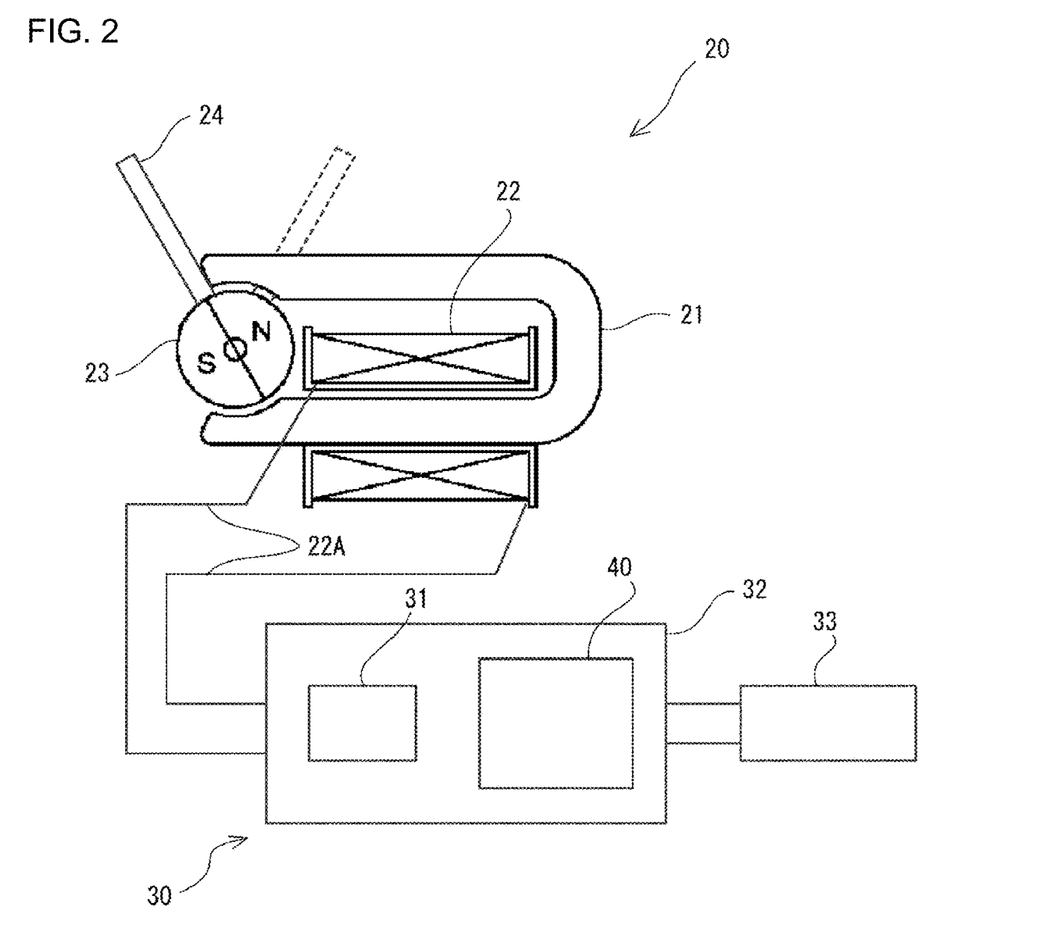
FIG. 2 is a schematic diagram of wiring of a drive.

As shown in FIG. 2, the drive 30 includes the circuit board 32 connected to conductive wires 22A in the coil 22 in the actuator 20. The circuit board 32 is also connected to a power supply circuit 33 in the electronic device. Although the power supply circuit 33 is commonly used with the camera module M, the blade open-close device 1 may use a dedicated, independent power source (e.g., a dry cell), in place of the power supply circuit 33.

Figure 3A:
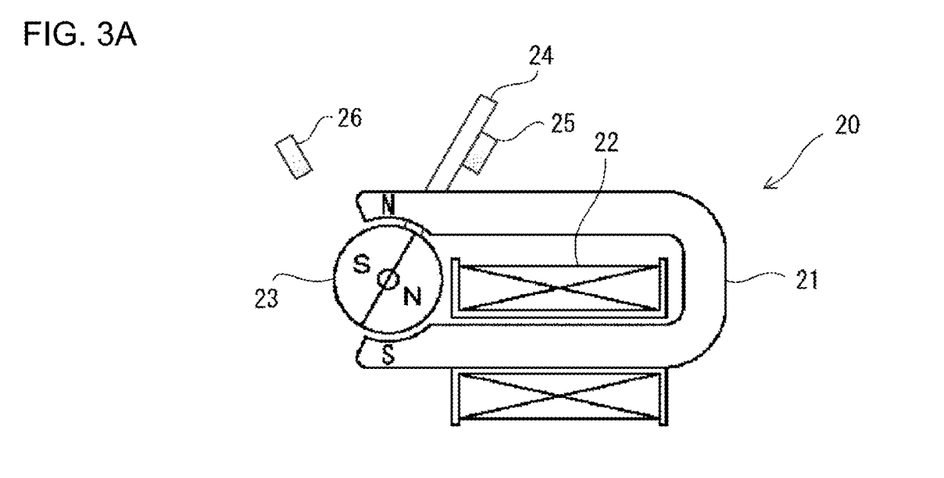
FIG. 3A is a schematic diagram of an actuator in an opening operation.
Figure 3B:
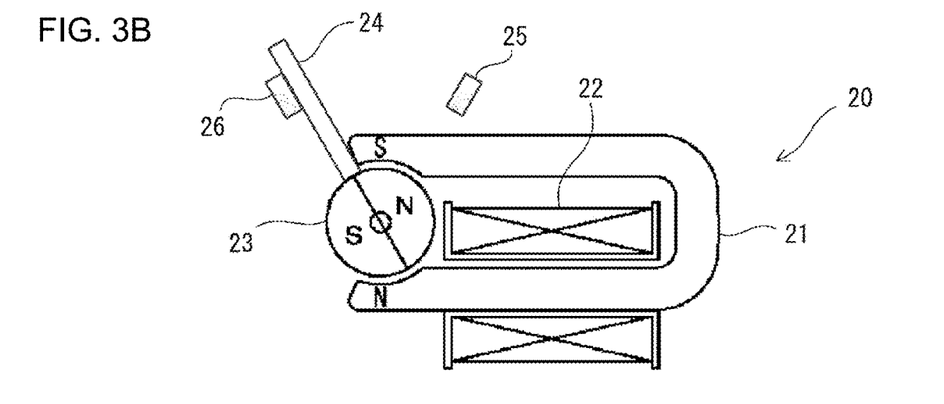
FIG. 3B is a schematic diagram of the actuator in a closing operation.

FIGS. 3A to 3C and FIGS. 4A to 4C are diagrams showing example operations of the actuator. The actuator 20 may be a known actuator. In the illustrated example, a unidirectional current flows through the coil 22, causing the two ends of the yoke 21 adjacent to the rotor magnet 23 to be magnetically polarized oppositely to each other as shown in FIG. 3A. The magnetic force attracts and rotates the rotor magnet 23, and moves the lever 24 to the opening position of the blade 10. The current through the coil 22 is reversed, reversing the magnetic polarities at the two ends of the yoke 21 as shown in FIG. 3B. The magnetic force attracts and rotates the rotor magnet 23 reversely, and moves the lever 24 to the closing position of the blade 10.

Figure 3C:
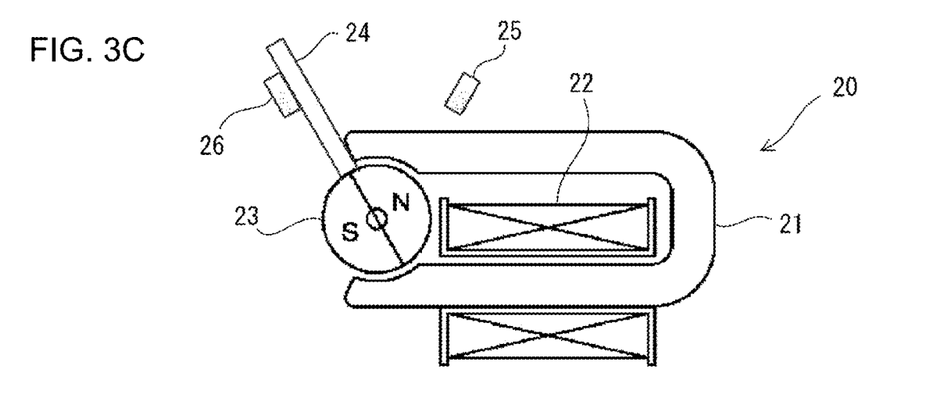
FIG. 3C is a schematic diagram of the actuator in a nonenergized state.

As shown in FIGS. 3A to 3C, magnets 25 and 26 are located at the opening and closing positions of the lever 24 to magnetically attract the lever 24, which is formed from a magnetic material. When the coil 22 is not energized, the lever 24 is attracted by the magnet 25 or 26 and can remain at the opening or closing position as shown in FIG. 3C. The actuator 20 can thus retain the open and/or closed state of the blade 10 without being energized. This prevents the blade 10 from being stopped between the opening position and the closing position in a nonenergized state.

Figure 4A:
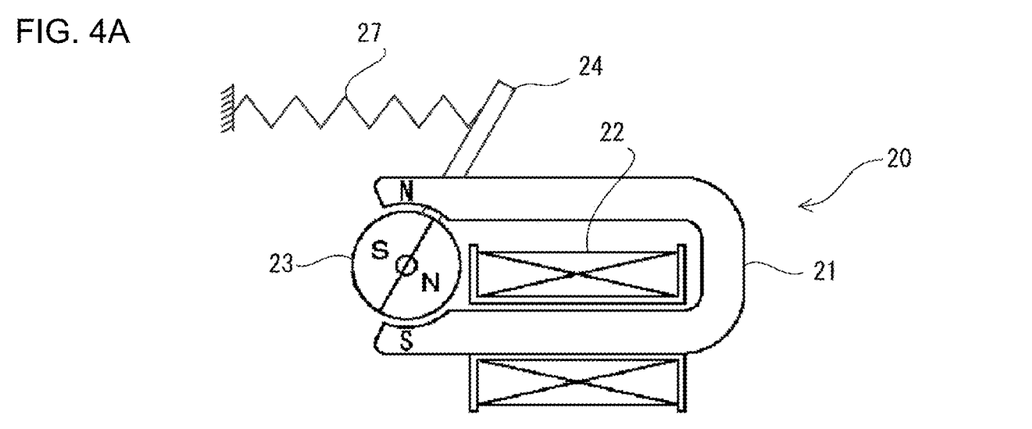
FIG. 4A is a schematic diagram of an actuator in an opening operation.
Figure 4B:
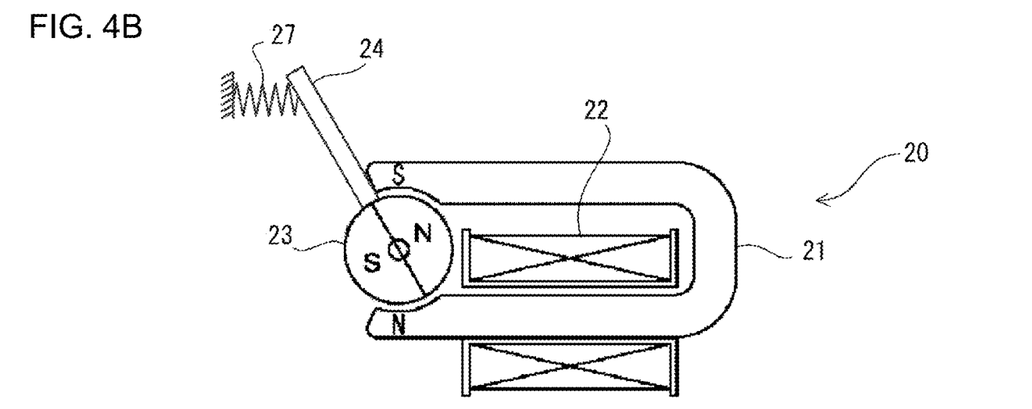
FIG. 4B is a schematic diagram of the actuator in a closing operation.
Figure 4C:
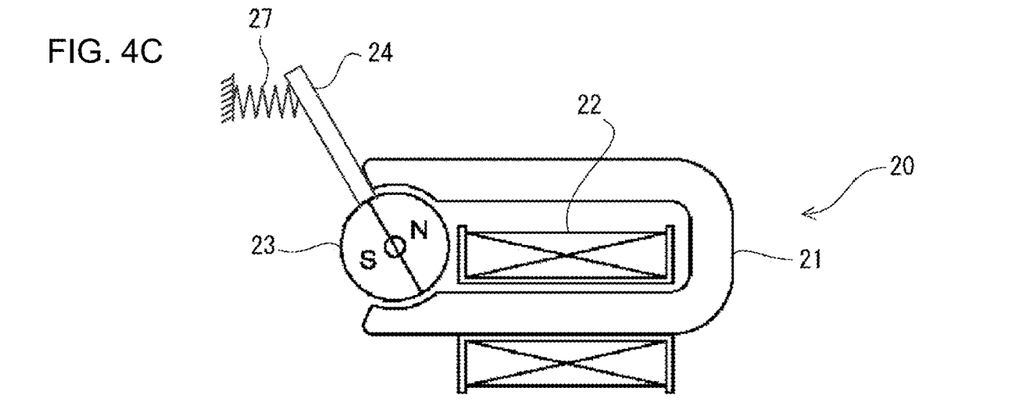
FIG. 4C is a schematic diagram of the actuator in a nonenergized state.

In the example shown in FIGS. 4A to 4C, the lever 24 is attached to an end of an urging member 27, such as a spring. When the coil 22 is not energized, the lever 24 is forcibly moved to the closing position under a tensile force from the urging member 27 as shown in FIG. 4C. The actuator 20 can thus retain the closed state of the blade 10 without being energized. The lever 24 is forcibly moved to the closing position in this example. The lever 24 may be forcibly moved to the opening position with the urging member 27 located oppositely. In the example in which the blade 10 remains closed in the nonenergized state, the lens aperture L remains covered in the nonenergized state. This reduces image capturing unintended by the user when the user forgets to operate the blade open-close device 1.

The blade open-close device 1 with the above features includes the mechanical switch operation member 41 that generates the opening signal and the closing signal in response to a manual operation on the switch 40 performed by the user and the drive 30 independent of the drive output from the camera module M. The user can thus intentionally operate the switch 40 to retain the closed state of the blade 10 when any unauthorized access to the electronic device controls the camera module M to capture images or to be ready for image capturing. This prevents images unintended by the user from being captured by the camera module M. With the user intentionally operating the switch 40 to retain the closed state of the blade 10, an image capturing operation performed by the camera module M in response to, for example, an accidental operation does not cause image capturing unintended by the user, thus preventing images from being stored into the electronic device.

The blade open-close device 1 reliably moves the blade 10 to either of the positions at which the blade 10 is open or closed in response to an operation performed on the switch 40, thus preventing the blade 10 from partially covering the lens aperture L. When intending to capture an image, the user can capture an intended image with the lens aperture L being uncovered completely. When not using the camera function, the user can intentionally cover the lens aperture L in a reliable manner and can avoid capturing unintended images.

Figure 5A:
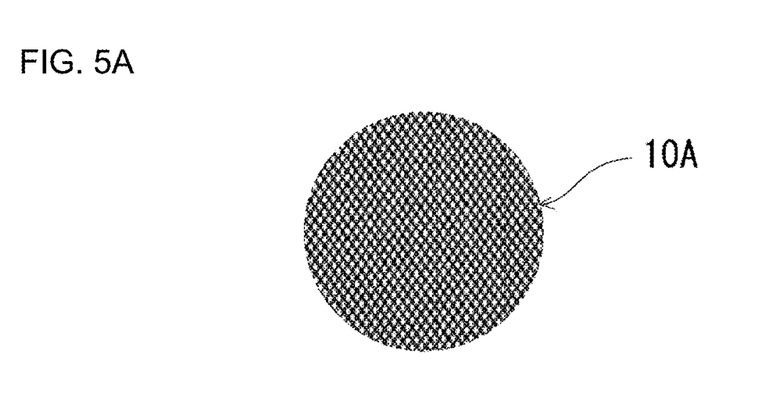
FIG. 5A is a schematic diagram of a reticulated light shading as an example shield included in a blade.
Figure 5B:
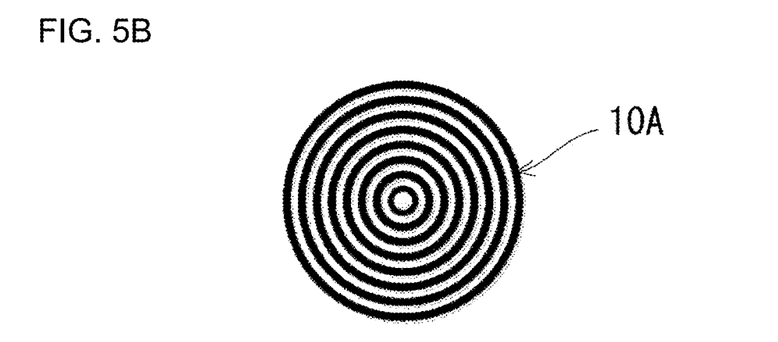
FIG. 5B is a schematic diagram of a light shading with concentric circular gaps as an example shield.
Figure 5C:
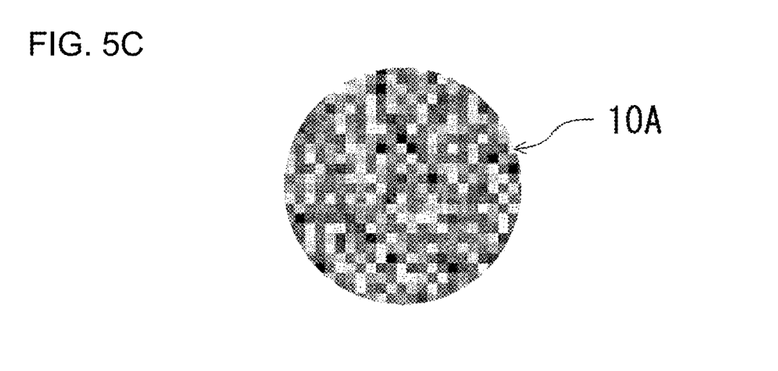
FIG. 5C is a schematic diagram of a mosaic filter as an example shield.

The blade 10 herein includes a shield 10A for covering the lens aperture L as shown in FIGS. 5A to 5C. The shield 10A may be a light shading that fully shades light incident on the lens aperture L, or may be a light shading that partially shades light incident on the lens aperture L to obstruct image capturing as shown in FIGS. 5A and 5B. An example light shading shown in FIG. 5A is reticulated. An example light shading shown in FIG. 5B includes concentric circular gaps.

The light shading with such a pattern can partially shade light incident on the lens aperture L to obstruct image capturing. The shield 10A in the blade 10 may be a filter, as an example shown in FIG. 5C. The filter filters light incident on the lens aperture L to obstruct image capturing. An example light shading shown in FIG. 5C is a mosaic filter for filtering light incident on the lens aperture L to obstruct image capturing.

Figure 6A:
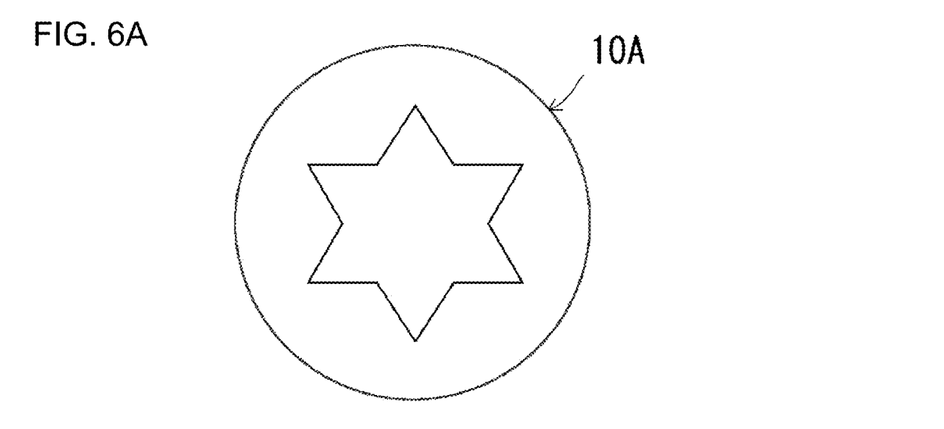
FIG. 6A is a schematic diagram of an example blade having its outer surface designed with a pattern.
Figure 6B:
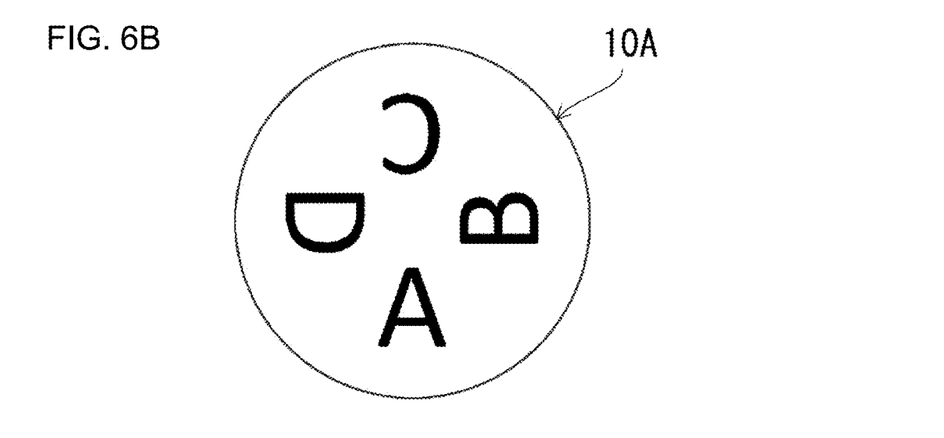
FIG. 6B is a schematic diagram of an example blade having its outer surface designed with characters.

The blade 10 in the closed state may be externally viewable for the user to see the state. The blade 10 may have an outer surface colored with a highly visible color, such as red. The blade 10 may also include the shield 10A having the outer surface with a designed pattern as shown in FIG. 6A. The blade 10 may also have designed characters to improve the appearance as shown in FIG. 6B.

Figure 7:
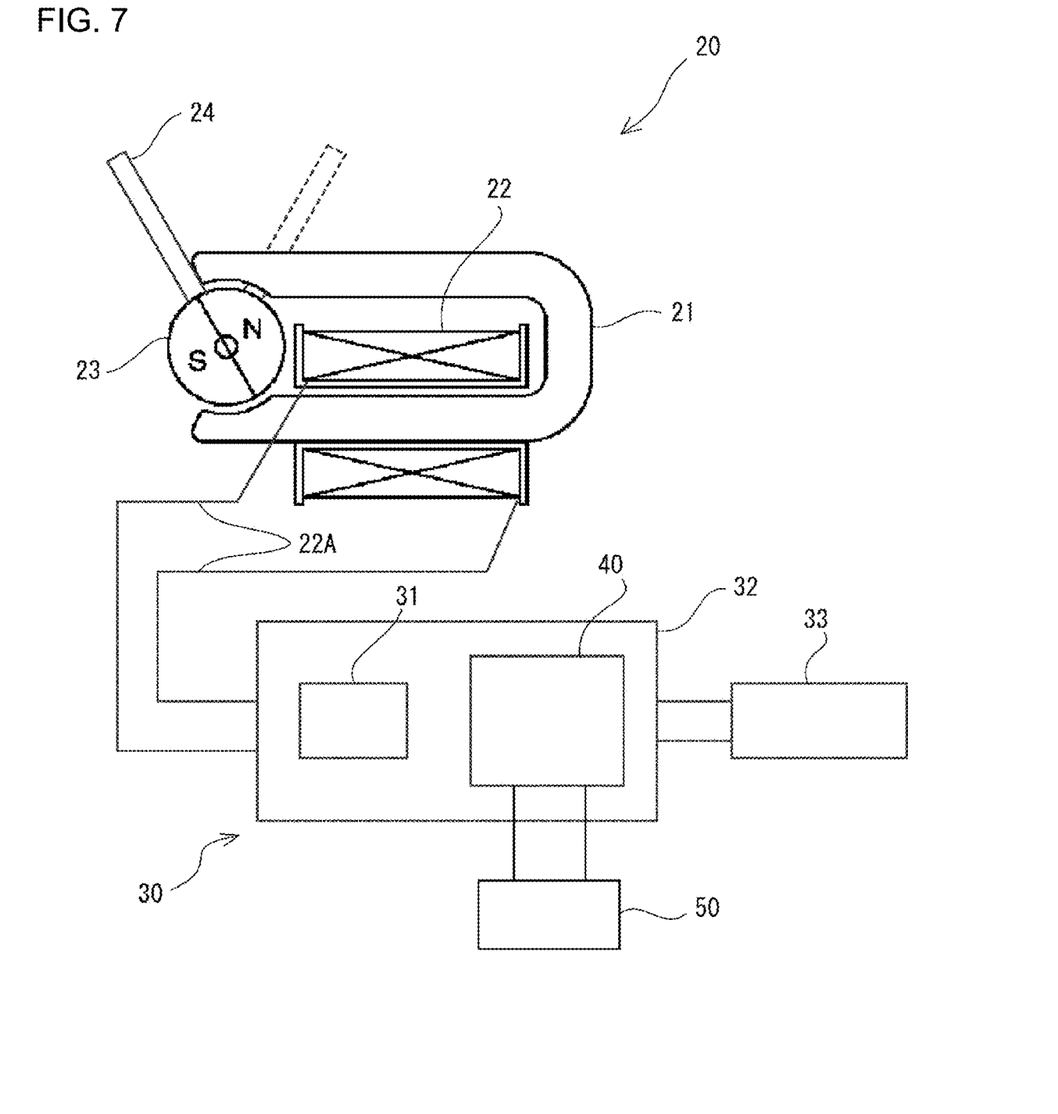
FIG. 7 is a schematic diagram of a drive in a blade open-close device according to another embodiment.
Figure 8:
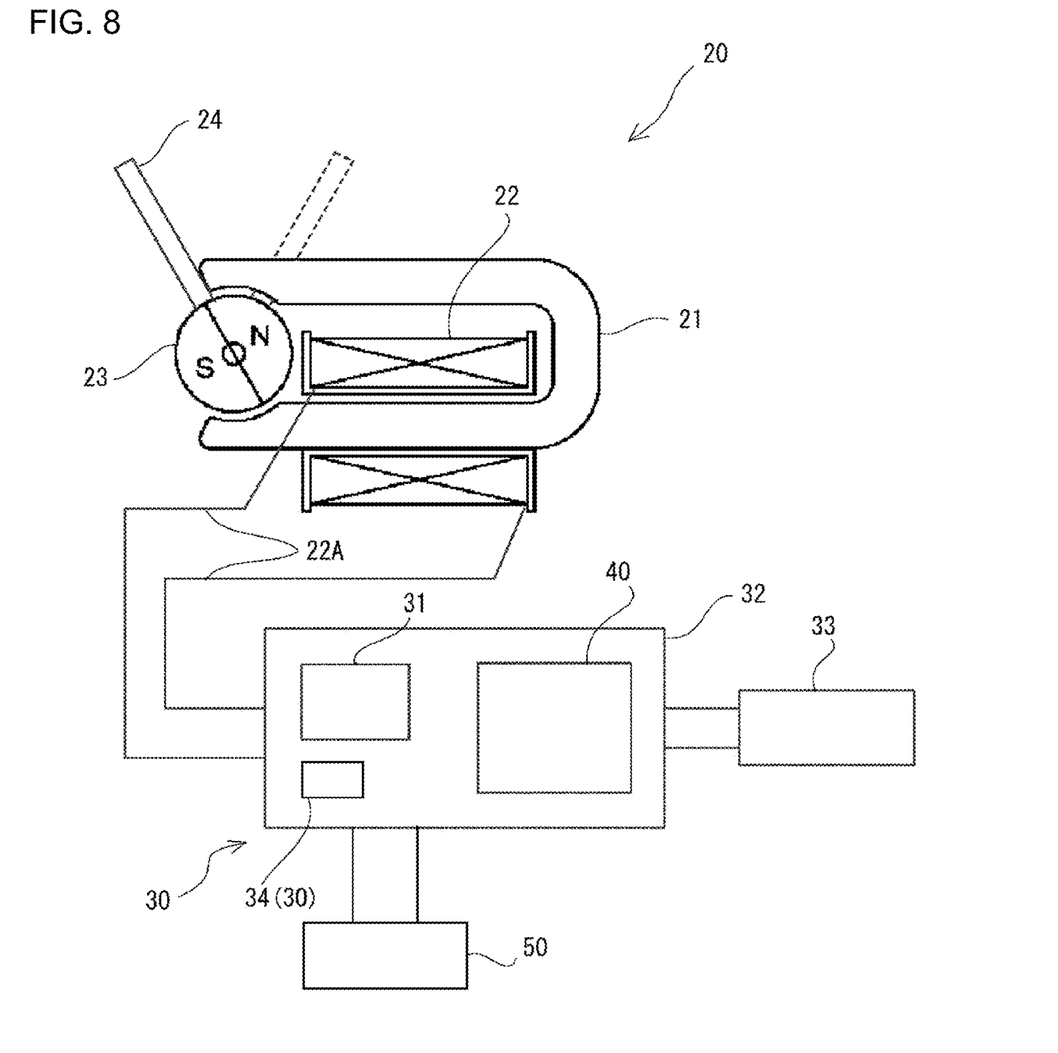
FIG. 8 is a schematic diagram of a drive in a blade open-close device according to still another embodiment.

In the embodiment described above, the blade open-close device 1 includes the drive 30 and the switch 40 that are completely independent of the camera module M excluding the power supply circuit 33. As shown in FIGS. 7 and 8, the blade open-close device 1 may transmit a signal from the drive 30 or the switch 40 to a camera drive circuit 50. In this case as well, although the drive 30 or the switch 40 transmits a signal to the camera drive circuit 50, the camera drive circuit 50 does not transmit any signal to the drive 30.

In the example shown in FIG. 7, an opening signal or a closing signal from the switch 40 is transmitted to the camera drive circuit 50. In this case, the camera module M may be enabled to capture images in response to a user operation on the switch 40 to open the blade 10. This allows prompt image capturing with the camera module M for a user intending to capture images. In response to a user operation on the switch 40 to close the blade 10, the camera module M may enter a sleep state or may be deactivated to avoid capturing images while the blade 10 is being closed. Also, the camera module M can remain deactivated while the camera function is unused. This saves electricity.

In the example shown in FIG. 8, the drive 30 includes a detector 34 for detecting the open or closed state of the blade 10. The detector 34 may detect an opening signal or a closing signal input into the drive 30 from the switch 40 or detect any change in the state of the actuator 20 operating in response to a signal from the drive 30 (e.g., a Hall sensor for detecting the state of the rotor magnet 23).

In the example shown in FIG. 8, the detector 34 detects a detection signal representing the open state or closed state. The detection signal is then transmitted to the camera drive circuit 50. In response to this signal transmitted to the camera drive circuit 50 indicating that the blade 10 is to be open or closed or is open or closed as intended by the user, the camera module M may be enabled to capture images or may enter a sleep state or may be deactivated.

Figure 9:
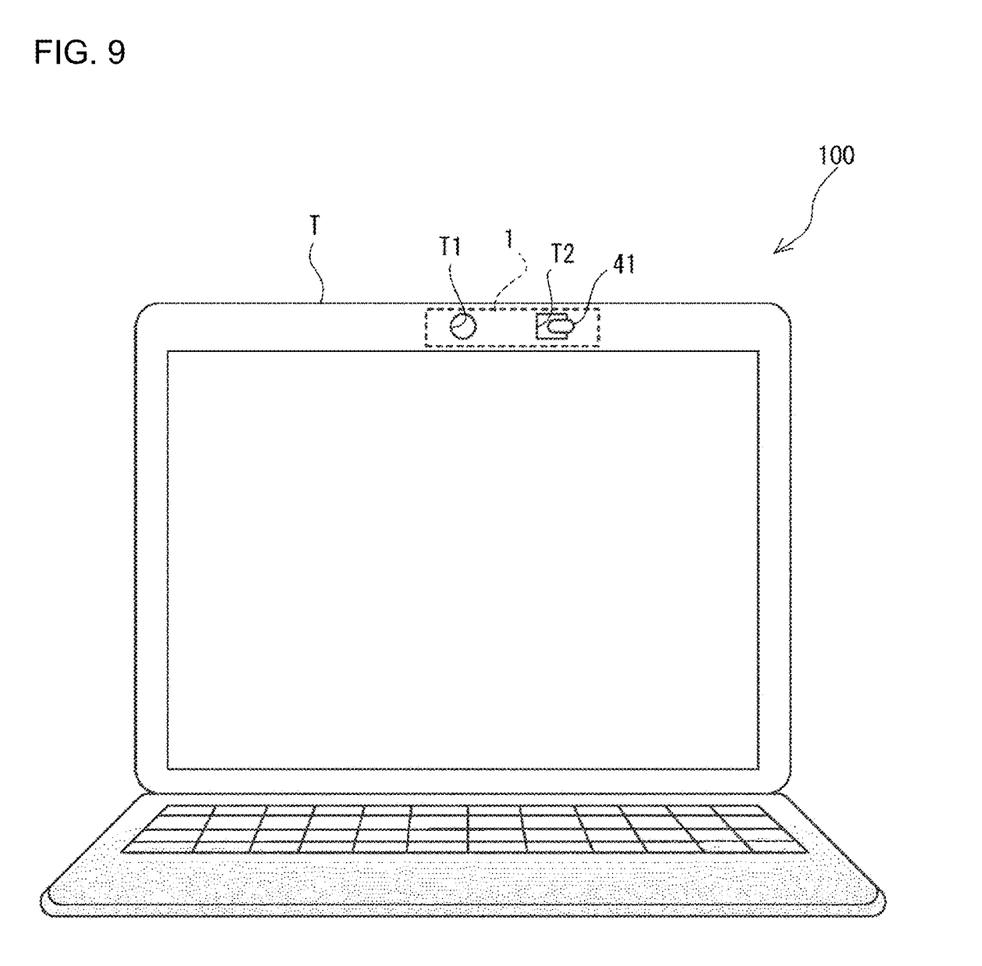
FIG. 9 is a schematic diagram of an electronic device (laptop personal computer) including the blade open-close device.

FIG. 9 is a schematic diagram of a laptop personal computer (PC) 100 with a camera function as an example of the electronic device including the blade open-close device 1. The blade open-close device 1 may be used in many IoT devices having a camera function, in addition to a PC, such as smartphones or other mobile information terminals, smart speakers with a camera function, and home security cameras.

As shown FIG. 1, the blade open-close device 1 including the thin actuator 20 can fit in a space with a size for the camera module M without using a large space on its front. The drive 30 and the switch 40 supported integrally with the actuator 20 as a unit can be easily installed inside the housing T of the electronic device.

The electronic device including the blade open-close device 1 can prevent images unintended by the user from being captured with the electronic device, thus avoiding leakage of private images and the user being suspected of secretly taking pictures. The electronic device with the camera function can be used without worrying in the IoT environment.

In one embodiment of the present invention, the mechanical switch 40 may be a toggle switch as shown in the figures. In another embodiment, the switch 40 may be a slide switch enabled by the mechanical switch operation member 41 moving in a slidable manner or a push switch enabled by the switch operation member 41 switching on and off with electrical contact.

The openings T1 and T2 may have dustproofing members placed around them to prevent dust from entering the housing T. More specifically, a colorless, transparent resin member may be fitted around the opening T1, or a spongy resin member may be placed between the edge of the opening T2 and the switch 40 without interfering with the operation of the switch operation member 41.

Although the embodiments of the present invention have been described in detail with reference to the drawings, the specific structures are not limited to the above embodiments. The present invention may be modified in design without departing from the spirit and scope of the present invention. Additionally, the techniques described in the above embodiments may be combined, unless any contradiction arises in their purposes and structures.

What is claimed is:

1. A blade open-close device, comprising:
   a blade configured to open or close a lens aperture in a camera module;
   an actuator configured to open or close the blade;
   a drive configured to drive the actuator; and
   a switch configured to input an opening signal and a closing signal into the drive; and
   a substrate, wherein the drive and the switch are mounted on the substrate, and the substrate overlaps the actuator in a direction parallel to an optical axis of the camera module,
   wherein the switch includes a mechanical switch operation member configured to generate the opening signal and the closing signal in response to a manual operation performed by a user, and
   the drive is independent of a drive output from the camera module.

2. The blade open-close device according to claim 1, wherein
   the drive is connected to an independent power source or to a power supply circuit commonly usable with the camera module.

3. The blade open-close device according to claim 1, wherein
   the drive and the switch are mounted on a substrate.

4. The blade open-close device according to claim 1, wherein
   the drive is supported integrally with the actuator.

5. The blade open-close device according to claim 1, wherein
   the actuator retains an open and/or closed state of the blade without being energized.

6. The blade open-close device according to claim 1, wherein
   the blade includes a light shading configured to fully or partially shade light incident on the lens aperture to obstruct image capturing.

7. The blade open-close device according to claim 1, wherein the blade includes a filter configured to filter light incident on the lens aperture to obstruct image capturing.

8. The blade open-close device according to claim 1, wherein the blade has an outer surface colored with a visible color or including a design.

9. The blade open-close device according to claim 1, wherein the switch or the drive transmits the opening signal or the closing signal to a circuit for driving the camera module.

10. The blade open-close device according to claim 1, further comprising:

a detector configured to detect an open state or a closed state of the blade, wherein the detector transmits a detection signal representing the open state or the closed state to a circuit for driving the camera module.

11. An electronic device, comprising:

the blade open-close device according to claim 1; and the camera module.

12. The blade open-close device according to claim 1, wherein the substrate on which the drive and the switch are mounted is connected to a blade open-close device.

13. The blade open-close device according to claim 12, wherein the switch operation member projects from an opening on a plane which is a same plane as the lens aperture.

14. The blade open-close device according to claim 1, wherein the actuator retains the open and closed state of the blade without being energized.

15. The blade open-close device according to claim 13, wherein a spongy resin member is between the opening and switch.

16. The blade open-close device according to claim 1, wherein the switch is within the camera module.

17. A blade open-close device, comprising:

a blade configured to open or close a lens aperture in a camera module;

an actuator configured to open or close the blade;

a drive configured to drive the actuator; and a switch extending through a first opening in the camera module, wherein the switch is configured to input an opening signal and a closing signal into the drive; and a substrate, wherein the drive and the switch are mounted on the substrate, and the substrate overlaps the actuator in a direction parallel to an optical axis of the camera module, wherein the switch includes a mechanical switch operation member configured to generate the opening signal and the closing signal in response to a manual operation performed by a user, and the drive is independent of a drive output from the camera module.

18. The blade open-close device according to claim 17, wherein the mechanical switch operation member extends through the first opening.

19. The blade open-close device according to claim 17, wherein the blade is configured to selectively block light from a second opening of the camera module from entering the lens aperture.

* * * * *